United States Patent [19]

Hyatt et al.

[11] Patent Number: 4,573,381
[45] Date of Patent: Mar. 4, 1986

[54] BORING DEVICE

[75] Inventors: James R. Hyatt, Kinnelon; Douglas K. Hyatt, Stratford, both of N.J.

[73] Assignee: Top Tech, Inc., Butler, N.J.

[21] Appl. No.: 583,443

[22] Filed: Feb. 24, 1984

[51] Int. Cl.⁴ .................. B23B 29/00; B23B 41/02
[52] U.S. Cl. ........................... 82/36 R; 82/34 R
[58] Field of Search ..................... 408/79–83, 408/223, 224, 226, 233, 188, 59, 705, 713, 200; 82/36 R, 34 R

[56] References Cited

U.S. PATENT DOCUMENTS

| | | | |
|---|---|---|---|
| 3,191,463 | 6/1965 | Ladendorf | 408/59 |
| 3,295,187 | 1/1967 | Plummer | 408/173 |
| 3,540,323 | 11/1970 | Rishel | 408/188 |
| 3,751,177 | 8/1973 | Faber | 408/226 |
| 3,963,365 | 6/1976 | Shallenberger | 408/713 |
| 4,108,567 | 8/1978 | Faber | 408/224 |
| 4,149,821 | 4/1979 | Faber | 408/705 |
| 4,194,862 | 3/1980 | Zweekly | 408/705 |
| 4,268,198 | 5/1981 | Peters | 408/713 |
| 4,284,375 | 8/1981 | Muhleisen | 408/705 |
| 4,405,266 | 9/1983 | Hansen | 82/2 R |

Primary Examiner—Leonidas Vlachos
Assistant Examiner—Jerry Kearns
Attorney, Agent, or Firm—Siegmar Silber

[57] ABSTRACT

A boring head for drilling deep holes of large diameter has a cylindrical body provided with a transverse slot in which a rectangular insert holder is clamped. The insert holder has a plurality of indexable inserts mounted thereon and a semi-cylindrical stabilizer is attached at each end of the insert holder and is provided with wear strips to support the boring head in the workpiece. The stabilizer and insert holder form a "D" shaped cross section which creates an annular space for the discharge of chips and coolant. The insert holder is provided with pockets cut at preselected angles which determine the rake angle of the inserts.

19 Claims, 20 Drawing Figures

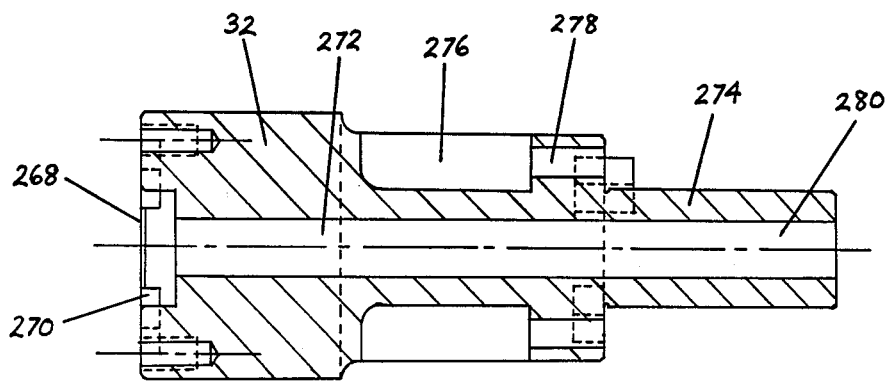
FIG. 14
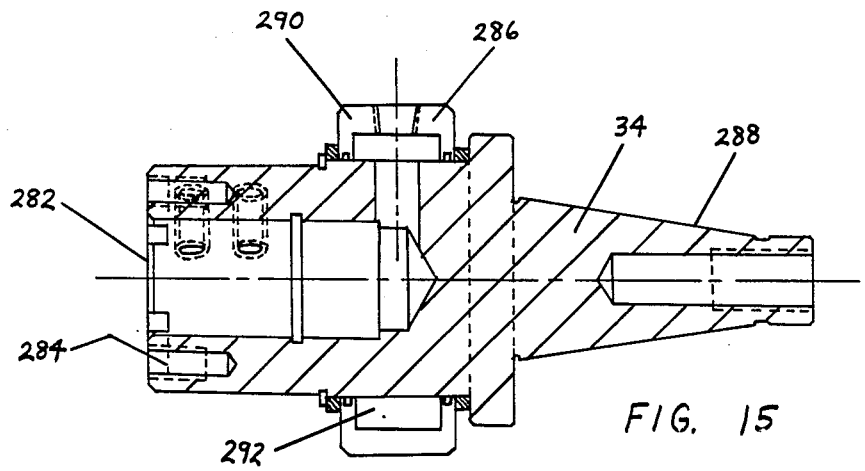
FIG. 15
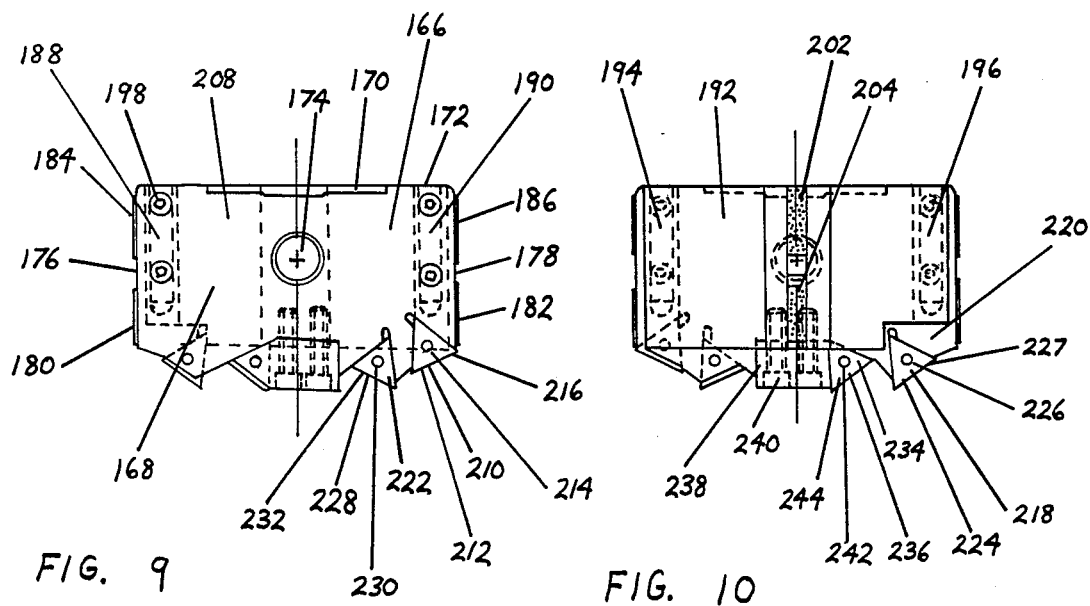
FIG. 9
FIG. 10

BORING DEVICE

BACKGROUND OF THE INVENTION

1. Field of the Invention

The invention relates to a horizontal boring system with an improved boring bar and cutting blade. In more detail a system is devised for efficient boring of large diameter holes in alloys which were previously difficult or uneconomical to bore.

2. Prior Information Disclosure

Prior to preparing this application, a patentability search was performed and was conducted in class 408, subclasses 705, 200, 188 and 83 and the corresponding foreign classes. The search uncovered the following:

| U.S. Pat. No. | Inventor | Date of Issue |
|---|---|---|
| 4,268,198 | Peters, Robt. W. | 5/19/81 |
| 4,265,574 | Eckle, Otto | 5/5/81 |
| 3,762,828 | Faber, Kurt H. A. E. | 10/2/73 |
| 3,759,625 | Iversen, Normal H. | 9/18/73 |
| 3,751,177 | Faber, Kurt H. A. E. | 8/7/73 |
| 3,389,621 | Wear, Richard E. | 6/25/68 |

The search disclosure was of a machine tool for the metal working application of deep hole machining, including the geometry of the cutting insert holder.

In the patent to Eckle, U.S. Pat. No. 4,265,574 ('574), a combined boring and milling tool with at least three triangular shaped turnable cutter blades is provided. The relationship among the various cutting inserts is particularly shown and is described in detail therein. The particular milling depth is controlled and the effective cutting in relationship to the cutter blade is also described. Turning to Faber, a drill with guide device is shown in U.S. Pat. No. 3,762,828 ('828). In the guide device of this invention a ball holder with balls and elastic spacers are provided. The structure and the purpose of these guide balls are shown. It is specifically stated that such a structure is applicable to full face boring and core drilling. A similar guide provision is provided in Faber, U.S. Pat. No. 3,751,177 ('177) in which the guide pad is adapted to track the surface of the hole where the drill is operated. This guide pad differs from that shown in the prior Faber patent in that the guide pad is pivotally rockable on at least one axis. The arrangement of cutting hands as shown in Faber '177 and in Wear, U.S. Pat. No. 3,389,621 ('621) all seem to differ substantially from the arrangement of the cutting insert holding blade of the present disclosure. A similar analyses can be made of the Iversen U.S. Pat. No. 3,759,625 and the Peters U.S. Pat. No. 4,268,198.

With the aforementioned patents considered and evaluated, the structure of the present invention was viewed as being patentable thereover. No one of the patents when considered separately anticipated the invention at hand and no grouping thereof resulted in a reference rendering the invention obvious.

In the past, several technological problems have persisted with large diametered, deep hole machining. Among the commonest is the need for repetitive borings along the same axis to provide a hole with a larger and larger diameter until the desired diameter is achieved. In part, because of the repetitive nature of operations, tolerances, including deviation from centerline, circularity and surface finish, have all been quite difficult to maintain. Other problems addressed by this invention are cooling of cutting inserts, removal of chips, and the prolonging of cutting tool life.

SUMMARY OF THE INVENTION

In the present invention a system for boring large diametered holes in metal billets is described. The system includes a unique cutting insert holder blade and a stabilizer therefor. With the pair of rectangular insert holders described, the boring of a large diametered hole is attainable in a single insertion and removal pass and with continuious cooling and chip removal. As is seen in the description which follows, a pattern of overlapping and abutting tooling inserts are provided with prescribed pockets therefor which in turn predetermine the rake angles of the cutting edges. The structure of the stabilizer further assists the maintenance of the tolerances as to centerline and surface finish of the hole being drilled.

OBJECTS OF THE INVENTION

It is an object of the invention to provide an improved boring device, particularly suited to horizontal deep hole drilling.

It is a further object of this invention to provide an improved boring device for drilling large diametered holes.

It is a yet further object of this invention to provide an improved boring device for economically boring holes in metallurgies for which deep hole drilling equipment is otherwise not available.

It is a still yet further object of this invention to provide a balanced boring device to provide for the metal removal at a rate several times faster than with present technology.

It is a feature of the present invention to have continuous cooling and chip removal with coolant/flushing fluids being supplied to the cutting site.

It is a yet further feature of this invention to use cutting inserts attached to a stabilized blade for boring without chatter.

It is a still yet further feature of this invention to have precise centering of tooling and to maintain specified tolerances and to obtain acceptable surface finishes on the wall of the hole drilled without using separate finishing equipment and tooling.

Other objects and features of the invention will become apparent as the drawings which follow are understood by reading the corresponding description thereof.

BRIEF DESCRIPTION OF THE DRAWINGS

FIG. 9 is a top plan view of the secondary cutting insert holder blade of FIG. 7;

FIG. 10 is a bottom plan view of the secondary cutting insert holder blade of FIG. 7;

FIG. 14. is a cross sectional view of the coupling adaptor of FIG. 1;

FIG. 15 is a cross sectional view of the taper adapter of FIG. 1;

DESCRIPTION OF THE PREFERRED EMBODIMENT

Figure 1:
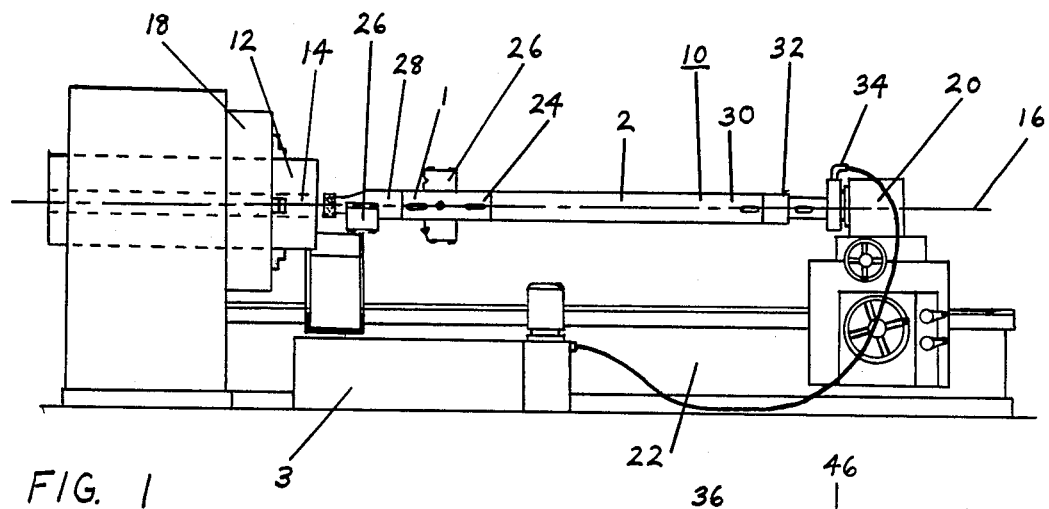
FIG. 1 is a schematic diagram showing the boring device system elements of this invention.
Figure 2:
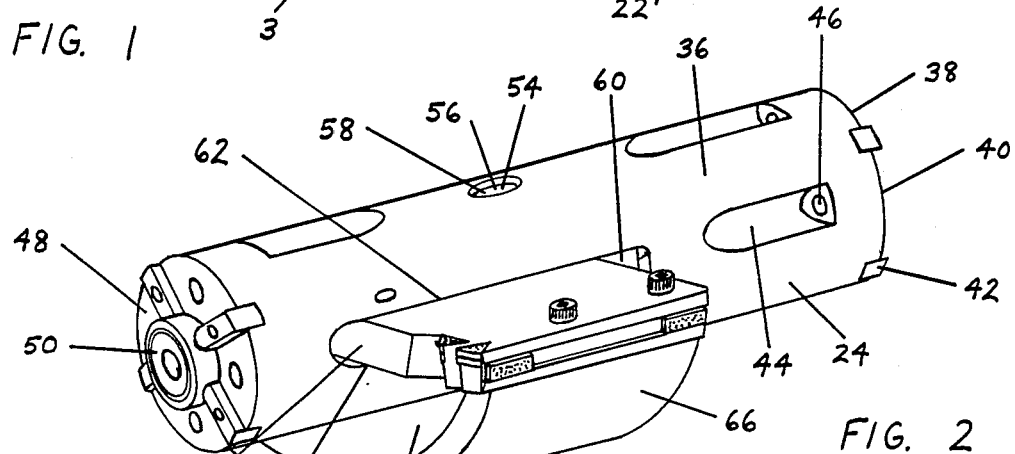
FIG. 2 is a perspective view showing the boring head and the primary insert holder and stabilizer therefor of this invention.
Figure 7:
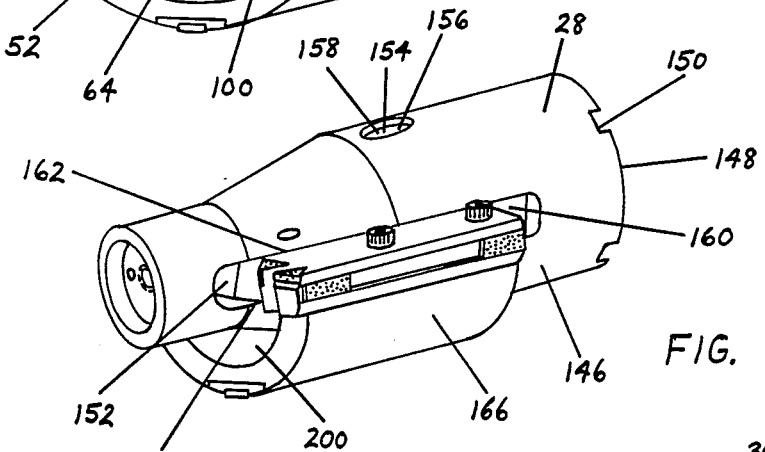
FIG. 7 is a perspective view showing the pilot bar mounting assembly and the second insert holder and stabilizer thereof of this invention.

The horizontal boring system is shown in the schematic diagram of FIG. 1 and the system is referred to generally by the reference numeral 10. In the best mode of practicing the invention, a workpiece 12 with a pilot hole 14 therethrough is rotated about its longitudinal axis 16 on a rotatory fixturing bed 18. To the cross slide assembly 20 of a lathe 22, the tooling for boring the large diameter hole is connected. Also, the coolant distribution arrangement is provided therewithin and the flushing fluid/chip removal circulating pattern is established thereby. In the description which follows and to facilitate the understanding of this invention, the preferred embodiment is described in three parts, namely, (1) the tooling section, including the boring head assembly 24, the cutting tool holder assembly 26, and the pilot bar mounting unit 28; (2) the lathe connection units, including the extension bar 30, the coupling adapter 32 and the taper adapter 34; and (3) the coolant distribution arrangement. Upon being set up for operation, the assemblies discussed have or operate about longitudinal axes that are colinear with longitudinal axis 16.

Referring now to FIGS. 2, 3, 6A and 6B, a perspective view of the tooling section and various detail views thereof are shown. In the discussion which follows the terms "forward" or "leading" and "rearward" or "trailing" are used with "forward" indicating the portion which during operation first enters the hole being bored and "rearward" indicating the portion closest to the cross-slide assembly 20. The boring head assembly 24 is constructed from a basically cylindrical body 36 with keyed rabbeted connectors at both ends thereof. The rearward end 38 has a rabbet mount 40 centrally disposed thereon and has corresponding antirotational keys 42 at 90 intervals about the mount. Adjacent the key 42, rearward clearance slots 44 for rearward mounting bolts 46 are provided for the attachment and locking up to either extension bar 30 or to coupling adapter 32. As will be explained in more detail hereinbelow, the interlocking arrangement described permits the structure to incorporate leak-free fluid conduits for coolant and flushing fluids. At the forward end 48 a similar rabbeted fitting is provided including rabbet mount 50 which is adapted to accommodate a tapered mounting coupler for a pilot bar or to accommodte a spade drill arrangement on combinations thereof. Intermediate the ends 38 and 48, a blade slot 52 is provided extending through the body 36 and symmetrically about the longitudinal axis thereof. Normal to the central plane of the slot 52, a blade clamp arrangement 54 is constructed including a blade clamp bolt access way 56 and blade clamp attaching hardware or abolt 58. For the accommodating of spade drill blades, shims or spacers, including blade spacer key 60 in the rearward portion of the slot and forward blade shims 62 and 64, disposed radially on either side of the tool holder, are supplied. Alternatively, a cutting insert holding blade assembly 66 is in the blade slot 52 and secured therein by blade clamp bolt 58.

Figure 4:
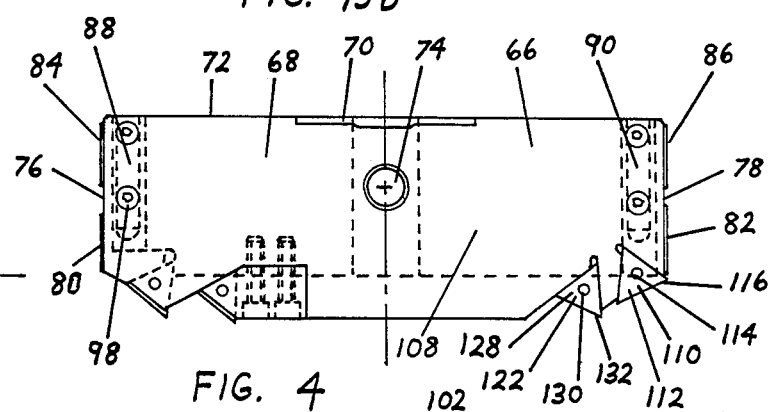
FIG. 4 is a top plan view of the primary cutting insert holder blade of FIG. 2.
Figure 5:
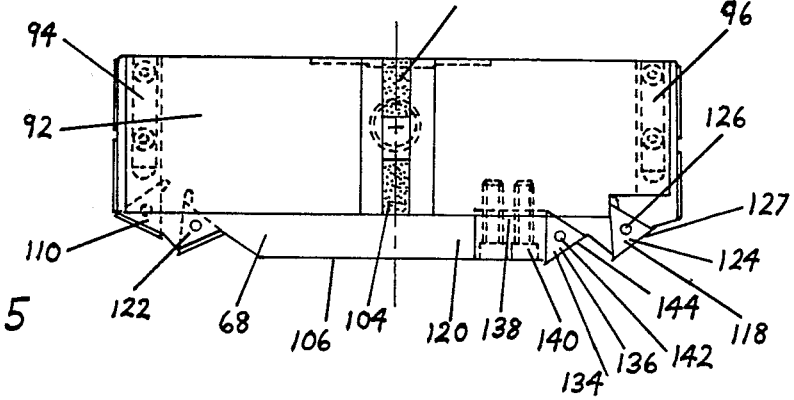
FIG. 5 is a bottom plan view of the primary cutting insert holder blade of FIG. 2.

Referring now to FIGS. 4 and 5 details of the cutting insert holding blade asembly 66 and associated components are shown. The cutting insert holding blade 68 is a substantially rectangular metal plate with mounting provisions for cutting inserts on the forward side and holder mounting provisions on the rearward side. Accordingly, a mounting notch 70 is constructed on the rearward side 72. Disposed adjacently, but axially spaced from notch 70 is holding blade bolt hole 74 for cooperative relationship with blade clamp arrangement 54 and for receiving bolt 58. On sides 76 and 78 adjacent rearward side 72 are located forward rub strips or pads 80 and 82 and rearward rub strips or pads 84 and 86. In the best mode of practicing the present invention, the rub strips are carbide rub strips Kennametal Cat No. K-1170 or equivalent (Kennametal Mfg. Co., Latrobe, Pa.). Along the sides 76 and 78 rabbeted grooves 88 and 90 are located for receiving the edges of the stabilizer, which grooves extend forward from the rearward edge of the holder 68. A stabilizer assembly 92 is attached to the blade 68 by placing the side tongue portions 94 and 96 into grooves 88 and 90, respectively, and securing with bolts 98. The stabilizer assembly 92 is constructed to extend in a semicircular manner about the holding blade 68 so that in the drilling process the stabilizer is adjacent the wall of the hole being drilled. This provides for a clear passageway 100 for chip removal and coolant/flushing fluid circulation. On the back of the stabilizer, rub strips 102 and 104 are mounted of similar or equivalent structure to rub strips 80 through 86. The geometry is such that the rub strips are arrayed in three pairs at 90 intervals over the 180 span. The holding blade and stabilizer, when assembled to the boring head, are structured so that, during rotation, chatter is minimized and machine balance is promoted.

The forward edge 106 of cutting insert holding blade 68 has four pockets for receiving cutting inserts. On the top surface 108, opposite surface in which grooves 88 and 90 are found, an outermost pocket 110 is constructed for receiving cutting insert 112 and includes a cam lock clamp 114. The insert shown is triangular; however, it is within the state of the art to modify the design to accommodate a functionally equivalent cutting insert of differing shape. Being outermost, the insert 112 defines the wall 114 of the hole being drilled. The cutting edge 116 of the insert 112 is set with a positive rake having an angle between the altitude of the triangle through the cutting edge and the centerline of 25. The cutting edge 116 is located in the most trailing position of the inserts and cuts along only the rearward portion of its cutting edge with the cutting on the remaining portion being relieved by the adjacent insert. Radially inward from pocket 110 are located an intermediate pocket 118 in the bottom surface 120 (adjacent the opposite side) and, yet further radially inward, an intermediate pocket 122 in the top surface 108 (adjacent pocket 110). The intermediate pocket 118 is constructed for receiving cutting insert 124 and includes a cam lock 126. This insert 124 is set with a positive rake of 35 as measured through cutting edge 126. The intermediate pocket 122 is constructed for receiving cutting insert 128 and includes a cam lock 130. This insert 128 is set with a negative rake of 25 as measured through cutting edge 132. Cutting inserts 124 and 128 are located in the most forward position and provide the initial cutting. The cutting edges 126 and 132 are in an abutting relationship and provide relief to each other at the abutment point. Radially inward from intermediate pocket 122 is the bottom surface 120; an innermost pocket 134 is located. The innermost pocket is constructed for receiving cutting insert 136, ha a pocket adjusting plate 138 with attaching hardware 140 and has a cam lock 142. This insert 136, in the preferred embodiment, is set with a positive rake of 25 as measured through cutting edge 144. The cutting action of insert 136 is intermediate that of the cutting actions of leading inserts 124 and 128 and of the trailing insert 112. The cutting edge 144 is in an overlapping relationship with edge 132 and these edges provide relief to each other in the same manner as edge 126 relieves edge 116. Although the geometry of the cutting insert arrangement just described is specific to a typical application for a given metallurgy, the changes required for other applications involve parameters normally encountered in setting up machine tools; e.g. specification of insert material, change of insert rake angles, operating speed of rotation, and setting cutting rate; and the description of such is beyond the scope of this specification.

Referring now to FIGS. 7 through 11 the tapered pilot bar mounting unit 28 is next described. The mounting unit 28 is constructed from a substantially frustoconical body 146 with a rabbeted connector at the broader end thereof. The broader end 148 is designed to include a rabbet socket and key slots 150 disposed therein and has corresponds to the male rabbet mount 50.

Through the mounting unit 28, a second blade slot 152 is provided extending through the frustoconical body 146 (at right angles to the first blade slot 52) and symmetrically about the longitudinal axis thereof. Normal to the central plane of the slot 152, a blade clamp arrangement 154 is constructed including a blade clamp bolt access way 156 and blade clamp attaching hardware or bolt 158. In the drilling of certain sized holes the cutting inserts attached to cutting insert holding blade 68 is sufficient to expand the pilot hole 14 to the bore of the desired size. However, in some instances of larger bores, operations are performed by a two-stage, single-pass drilling process wherein a second or supplemental blade is constructed to be attached to the pilot bar mounting unit 28 to bore from the outside diameter of the pilot hole to the moderate diameter of the first stage and wherein the primary blade 68 is arranged to bore from the moderate diameter of the first stage to the outside wall of the large diameter bore. For the accommodating of supplemental spade drill blades there are supplied shims or spacers, including blade spacer key 160 in the rearward portion of the slot and forward blade shims 162 and 164, disposed radially on either side of the supplemental tool holder. Alternatively, a cutting insert holding blade assembly 166 is in the blade slot 152 and secured therein by blade clamp bolt 158. Of the blade assembly 166, a cutting insert holding blade 168 is formed from a substantially rectangular metal plate with mounting provisions for cutting inserts on the forward side and holder mounting provisions on the rearward side. Accordingly, a mounting notch 170 is constructed on the rearward side 172. Disposed adjacently, but axially spaced from notch 170 is holding blade bolt hole 174 for cooperative relationship with blade clamp arrangment 154 and for receiving bolt 158. On sides 176 and 178 adjacent rearward side 172 are located forward rub strips or pads 180 and 182 and rearward rub strips or pads 184 and 186. Along the sides 176 and 178 rabbeted grooves 188 and 190 are located for receiving the edges of the stabilizer, which grooves extend forward from the rearward edge of 168. A stabilizer assembly 192 is attached to the blade 168 by placing the side tongue portions 194 and 196 into grooves 188 and 190, respectively, and securing with bolts 198. The stabilizer assembly 192 is constructed to extend in a semicircular manner about the holding blade 168 so that in the drilling process the stabilizer is adjacent the wall of the hole being drilled. This provides for a clear passageway 200 for chip removal and coolant/flushing fluid circulation. On the back of the stabilizer, rub strips 202 and 204 are mounted of similar or equivalent structure to rub strips 180 through 186. The geometry is such that the rub strips are arrayed in three pairs at 90 intervals over the 180 span. The holding blade and stabilizer, when assembled to the tapered pilot bar mounting unit 28 are structured so that, during rotation, chatter is minimized and machine balance is promoted.

The forward edge 106 of cutting insert holding blade 168 has four pockets for receiving cutting inserts. On the top surface 208, opposite surface in which grooves 88 and 90 are found, an outermost pocket 210 is constructed for receiving cutting insert 212 and includes a cam lock clamp 214. The insert shown is triangular; however, it is within the state of the art to modify the design to accommodate a functionally equivalent cutting insert of differing shape. Being outermost, the insert 212 defines the wall 214 of the hole being drilled. The cutting edge 216 of the insert 212 is set with a positive rake having an angle between the altitude of the triangle through the cutting edge and the centerline of 25. The cutting edge 216 is located in the most trailing position of the inserts and cuts along only the rearward portion of its cutting edge with the cutting on the remaining portion being relieved by the adjacent insert. Radially inward from pocket 210 are located an intermediate pocket 218 in the bottom surface 220 (adjacent the opposite side) and, yet further radially inward, an intermediate pocket 222 in the top surface 208 (adjacent pocket 210). The intermediate pocket 218 is constructed for receiving cutting insert 224 and includes a cam lock 226. This insert 224 is set with a positive rake of 35 as measured through cutting edge 226. The intermediate pocket 222 is constructed for receiving cutting insert 228 and includes a cam lock 230. This insert 228 is set with a negative rake of 25 as measured through cutting edge 232. Cutting inserts 224 and 228 are located in the most forward position and provide the initial cutting.

The cutting edges 226 and 232 are in an abutting relationship and provide relief to each other at the abutment point. Radially inward from intermediate pocket 222 is the bottom surface 220; an innermost pocket 234 is located. The innermost pocket is constructed for receiving cutting insert 236, has a pocket adjusting plate 238 with attaching hardware 240 and has a cam lock 242. This insert 236, is set with a positive rake of 25 as measured through cutting edge 244. The action of cutting insert 236 is intermediate that of the cutting actions of leading inserts 224 and 228 and of the trailing insert 212. The cutting edge 244 is in an overlapping relationship with edge 232 and these edges provide relief to each other in the same manner as edge 226 relieves edge 216.

Figure 12:
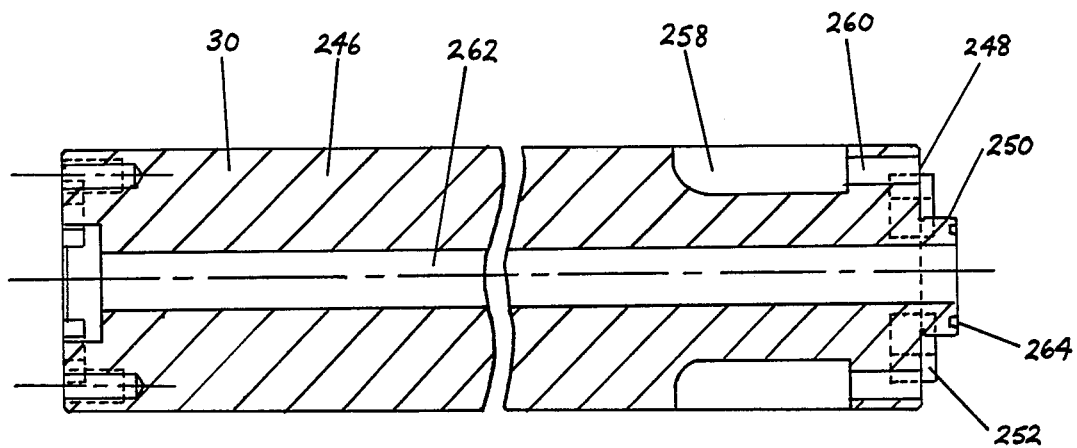
FIG. 12 is a cross sectional view of the extension assembly of FIG. 1.
Figure 6A:
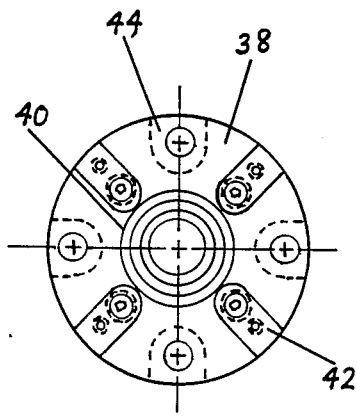
FIG. 6A is an end elevational view of the rearward end of the boring head of FIG. 3.
Figure 6B:
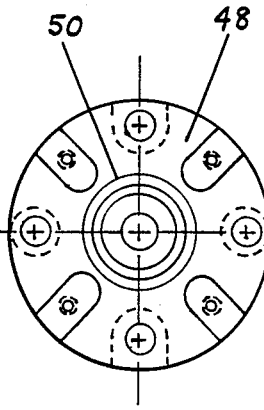
FIG. 6B is an end elevational view of the forward end of the boring head of FIG. 3.
Figure 13A:
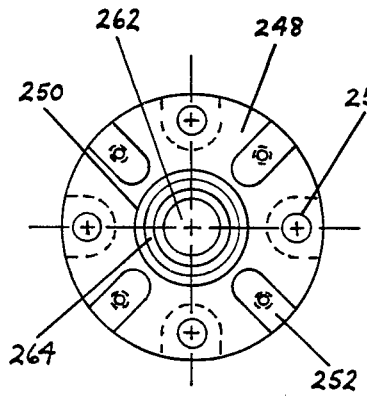
FIG. 13A is an end elevational view of the rearward end of the extension assembly of FIG. 12.
Figure 13B:
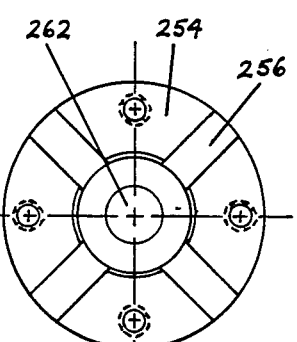
FIG. 13B is a view of the forward end of the extension assembly of FIG. 12.

Referring now to FIGS. 12, 13A and 13B an extension bar assembly is shown, and is referred to generally by the number 30. The extension assembly is constructed from a basically cylindrical body 246 with a male keyed rabbeted connector to mate the coupling adapter 32 and a female rabbeted connector to mate with the rearward end to the boring head. The trailing end 248 of the extension assembly has a rabbet mount 250 centrally disposed therein and has corresponding antrirotational keys 282 at 90 intervals about the mount. At the leading end 254, a rabbet socket and surrounding key slots 256 disposed therein is located so as to correspond with the male rabbet mount 50 or, when more than one extension is used with the male rabbet mount 250 of the adjacent extension. Adjacent the keys 252 clearance slots 258 for extension mounting bolts 260 are provided. A central fluid conduit 262 is incorporated in the extension assembly 30 and is provided with a O-ring groove 264 and O-ring 266 in the male rabbet mount 250.

Referring now FIGS. 14 and 15 the coupling adapter 32 and the taper adapter 34 are shown in detail. These adapters connect the rearward end of the boring head assembly 24 or the rearward end of the boring head assembly 24 with one or more extension assemblies 30 attached thereto the cross-slide assembly of the lathe. Although the horizontal boring system 10 of this invention is shown as an attachment to the cross-slide portion of a lathe with the workpiece 12 mounted on a rotatory fixturing bed 18, any number of drive arrangements could be employed. With some alternate arrangements, corresponding differences in the adapters 32 and 34 would be dictated. At the leading end 268 of coupling adapter 32, a rabbet socket and surrounding key slots 270 disposed therein is located so as to correspond with the male rabbet mount 50 of the boring head or with the male rabbet mount 250 of the most trailing extension bar assembly 30. A central fluid conduit 272 is constructed to extend through coupling adapter 32 and along the longitudinal axis thereof. Rearward of rabbet mount 250 is a mount arrangement 274 for cooperative relation with the taper adapter 34. At the rearward end of mount arrangement 274, clearance slots 276 are provided for mounting bolts 278 to attach coupling adapter 32 to taper adapter 34. Yet further rearward a conduit portion 280 is provided which upon assembly, fits wholly within taper adapter 34. The conduit portion 280 is sealed to the taper adapter 34 to preclude the leakage of fluids. The taper adapter 34 is constructed to include a mating end 282 with bolt holes 284 therein to accept mounting bolts 278, a slip ring assembly 286 rearward of mating end 282, and a taper fitting 288 which is attached to the drive unit or in this case the cross slide assembly of a lathe. The outer portion 290 of slip ring assembly 286 is designed to remain stationary during the rotation of the boring head and provides a fluid plenum 292 for introducing both liquid and gaseous substances for cooling and chip removal. The taper adapter as used in the preferred embodiment is commercially available from either Waukesha Cutting Tools, Inc. Waukesha, Wis. or Muskegon Tool Industries, Inc., Muskegon, Mich. (Muskegon Cat. No. 50 MMAC-200-(modified) and No. CR-5 or equivalents).

Figure 16:
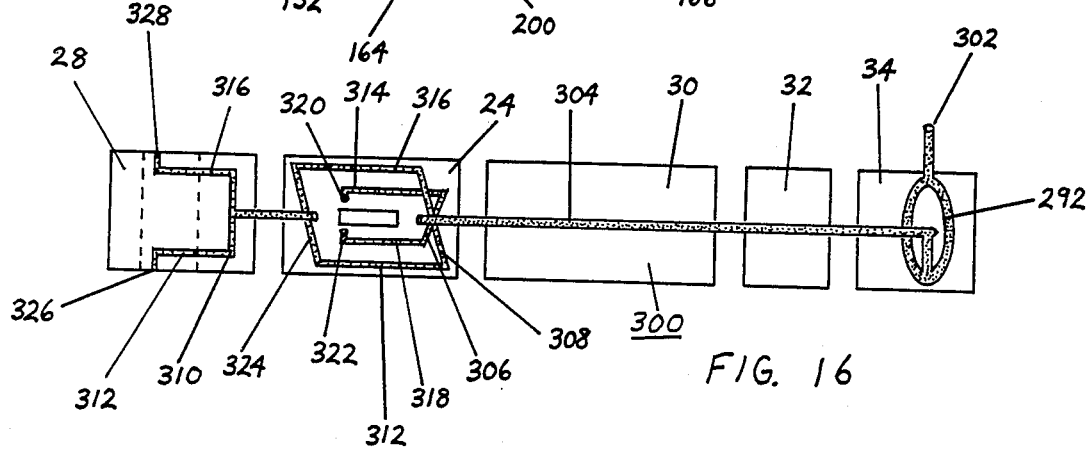
FIG. 16 is a schematic diagram showing the fluid flow throughout the boring device system elements shown in FIG. 1.
Figure 3:
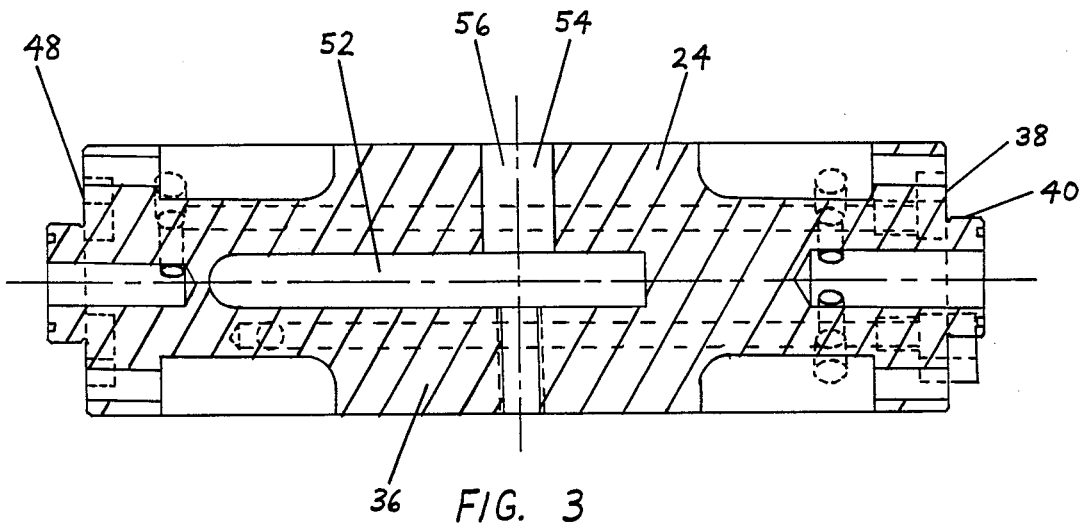
FIG. 3 is a cross sectional view of the boring head of FIG. 2.
Figure 8:
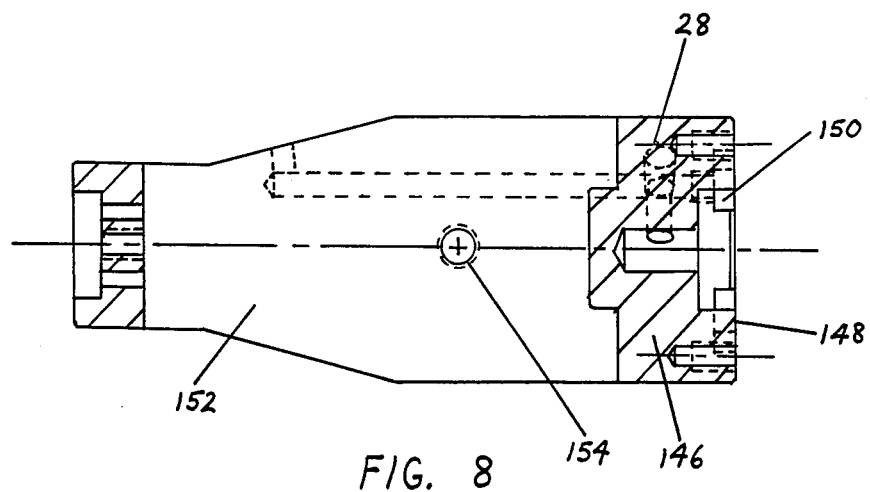
FIG. 8 is a cross sectional view of the pilot bar mounting assembly of FIG. 7.
Figure 17A:
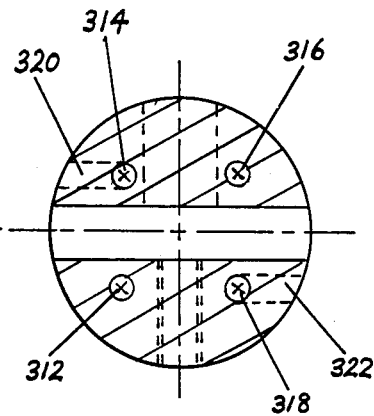
FIG. 17A is a cross sectional view of the boring head to show the position of the fluid conduits relative to the primary cutting insert holder blade.
Figure 17B:
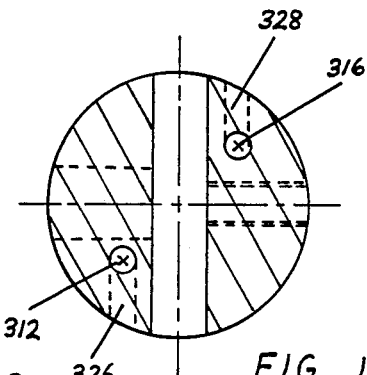
FIG. 17B is a cross sectional view of the pilot bar mounting assembly to show the position of fluid conduits relative to the secondary cutting insert holder blade.
Figure 11:
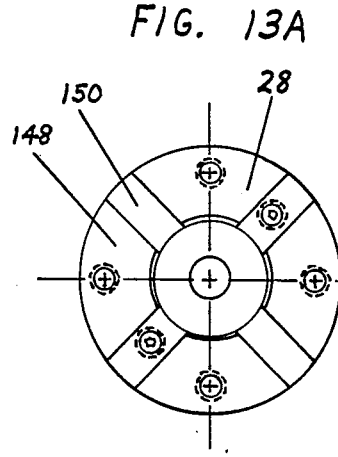
FIG. 11 is an end elevational view of the rearward end of the pilot bar mounting assembly of FIG. 8.

Referring now to FIGS. 16, 17A and 17B a schematic representation of the fluid conduits system, generally referred to by reference designator 300, is shown. The coolant and flushing fluids are introduced to the sytem 300 at an inlet port 302 in the slip ring assembly 286 and are introduced into fluid plenum 292. In general terms a main or primary conduit 304 along the longitudinal axis of the boring head is used, and in those assemblies in which blade slots displace the conduit, stream splitting transverse conduits 306, 308 and 310 are constructed to distribute the fluids around the blade slots. In the boring head assembly 24, transverse conduits 306 and 308 are structured so as to split the flow into four secondary conduits 312, 314, 316 and 318. Secondary conduit 314 terminates adjacent the leading edge of cutting insert holder 68 and an outlet port 320 delivers cooling and flushing fluids to the cutting inserts mounted on the top surfce 108. Secondary conduit 318 is similarly terminated and air outlet port 322 delivers fluids to the cutting inserts mounted on the bottom surface 120. Secondary conduits 312 and 316 are constructed so that the fluids thereof are gathered by a transverse conduit 324 area fed from boring head assembly 24 into pilot bar mounting unit 28, and are split by a transverse conduit 310 into two corresponding streams through continuing conduits 312 and 316. Secondary conduit 312 terminates adjacent the leading edge of cutting insert holder 168 and an outlet port 326 delivers cooling and flushing fluids to the cutting inserts mounted on the top surface 208. Secondary conduit 316 is similarly terminated and an outlet port 328 delivers fluids to the cutting inserts mounted on tne bottom surface 220. Fluid leakage between any two adjacent assemblies is precluded by O-ring fittings therebetween as is customary in the art. For more precise delivery of fluids, nozzles, deflectors or other known fluid handling devices may optionally be incorporated in the outlet ports 320, 322, 326 and 328.

Although the best mode of the invention has been described herein in some detail, it has not been possible to include each and every variation. Those skilled in the art of boring large diametered deep holes in metal billets will be able to make slight variations in the mechanical arrangement suggested hereby without departing from the spirit of the invention and still be within the scope of the claims appended hereto.

What is claimed is:

1. A boring device for use with a machine for drilling a large diametered, deep hole in a metal billet, said boring machine having a boring head with a blade slot therethrough, said device comprising in combination:

cutting insert holder means for holding a plurality of cutting inserts along the leading edge thereof, said insert holder means being of substantially rectangular shape and dimensioned for insertion thereof through said blade slot and extending across the hole to be drilled;

blade clamp means in said boring head adapted to hold said insert holder means in the blade slot;

stabilizer means for supporting said insert holder means and for attachment to the outermost sides of said insert holder means, said stabilizer means dimensioned to conform to the wall of said hole to provide support therefor and to preclude restricting fluid flow about said insert holder means, said stabilizer means and said insert holder means together forming a D-shaped, semicylindrical body;

attachment means for attaching said stabilizer to said insert holder means; and, a plurality of cutting inserts attached to the leading edge of said insert holder means for cutting the metal billet with overlapping cutting patterns and with at least one said cutting insert disposed on each side of said blade slot;

whereby an annular space for transportating a mixture of cooling fluid and metal chips is provided between said boring head, said insert holder means and the wall of the bore and between said boring head, said insert holder means and said stabilizer means.

2. A boring device as described in claim 1 wherein said cutting insert holder means further comprises a plurality of rub strips mounted in each edge thereof for contacting the wall of the hole being drilled; and, wherein said stabilizer further comprises a plurality of rub strips mounted on the back thereof for contacting the wall of the hole being drilled; whereby the chatter experienced during boring operations is minimized.

3. A boring device as described in claim 1 wherein said plurality of cutting inserts, in turn, further comprises;

a first insert mounted on the top surface of said cutting insert holder and positioned on said leading edge so as to form the wall of the hole being drilled;

a second insert mounted on the bottom surface of said cutting insert holder and positioned on said leading edge inward of said first insert so that the cutting action thereof overlaps and relieves the cutting edge of said first insert; and, a third insert mounted on the top surface of said cutting insert holder and positioned on said leading edge abutting said second insert so that the cutting action thereof at the edge thereof relieves the cutting edge of said second insert.

4. A boring device as decribed in claim 3 wherein said plurality of cutting inserts, in turn, further comprises;

a fourth insert mounted on the bottom surface of said cutting insert holder and positioned on said leading edge inward of said third insert so that the cutting action thereof overlaps and relieves the cutting edge of the third insert.

5. A boring device as described in claim 1 wherein said cutting inserts are polygonally shaped and have several edges each of which may positioned in the cutting edge position.

6. A boring device described in claim 5 wherein said cutting inserts are clamped to said cutting insert holder by a cam lock fastener.

7. A boring device described in claim 3 wherein said inserts are housed in fixed pockets predetermining the rake angles with which the cutting edges are set.

8. A boring device described in claim 7 wherein said first insert has a positive rake angle of 25, said second insert has a positive rake angle of 35, and said third insert has a negative rake angle of 25.

9. A boring device for use with a machine for drilling a large diametered, deep holes in metal billets, said boring device comprising in combination:

a cylindrical body having a leading end and a trailing end;

an elongated blade slot along and through the longitudinal axis of said body;

insert holder means for holding a plurality of cutting inserts along the leading edge thereof, said insert holder means being of substantially rectangular shape and dimensioned for insertion thereof through said blade slot and extending across the hole to be drilled;

blade clamp means in said boring head adapted to hold said insert holder means in the blade slot;

stabilizer means for supporting said insert holder and for attachment to the outermost sides of said insert holder means, said stabilizer means dimensioned to conform to the wall of said hole, to provide support therefor and to preclude restricting fluid flow in and around said insert holder means, said stabilizer means and said insert holder means together forming a D-shaped, semicylindrical body attachment means for attaching said stabilizer to said insert holder means; and, a plurality of cutting inserts attached to the leading edge of said insert holder means for cutting said metal billets with an overlapping cutting pattern and with at least one said cutting insert disposed on each side of said blade slot;

conduit means for transporting cooling and chip removal fluid to the cutting site; and, whereby an annular space for transporting a mixture of cooling fluid and metal chips is provided between said boring head, said insert holder means and the wall of the bore and between said boring head, said insert holder means and said stabilizer means.

10. A boring device as described in claim 9 wherein said cutting insert holder means is substantially rectangular in shape and, when attached to said stabilizer means forms a D-shaped, semicylindrical body.

11. A boring device as described in claim 10 wherein said cutting insert holder means further comprises a plurality of rub strips mounted in each edge thereof for contacting the wall of the hole being drilled; and, said stabilizer further comprises a plurality of rub strips mounted on the back thereof for contacting the wall of the hole being drilled;

whereby the chatter experienced during boring operations is minimized.

12. A boring device as described in claim 9 wherein said plurality of cutting inserts, in turn, further comprises;

a first insert mounted on the top surface of said cutting insert holder and positioned on said leading edge so as to form the wall of the hole being drilled;

a second insert mounted on the bottom surface of said cutting insert holder and positioned on said leading edge inward of said first insert so that the cutting action thereof overlaps and relieves the cutting edge of said first insert;

a third insert mounted on the top surface of said cutting insert holder and positioned on said leading edge abutting said second insert so that the cutting action thereof at the edge thereof relieves the cutting edge of said second insert; and a fourth insert mounted on the bottom surface of said cutting insert holder and positioned on said leading edge inward of said third insert so that the cutting action thereof overlaps and relieves the cutting edge of the third insert.

13. A boring device as described in claim 9 wherein said conduit means extends longitudinally through said cylindrical body, said conduit has one portion thereof with a first outlet adjacent cutting inserts mounted on the top surface of said holder means and another portion thereof with a second outlet adjacent cutting inserts mounted on the bottom surface of said holder means.

14. A boring device for use with a machine for drilling a large diametered, deep holes in metal billets having a pilot hole along the axis of the hole to be drilled, said boring device comprising:
a cylindrical body having a leading end and a trailing end;
a first elongated blade slot along and through the longitudinal axis of said cylindrical body;
first insert holder means for holding a plurality of cutting inserts along the leading edge thereof, said insert holder means dimensioned for insertion thereof through said first blade slot and extending across the hole to be drilled;
first stabilizer means for supporting said first insert holder attached to the outermost sides of said insert holder means, said stabilizer means dimensioned to conform to the wall of said hole, to provide support therefor and to preclude restricting fluid flow in and around said first insert holder means;
a plurality of first cutting inserts attached to the leading edge of said first insert holder means for cutting said metal billets with an overlapping cutting pattern;
first conduit means for transporting cooling and chip removal fluid to the cutting site of the first cutting inserts;
a substantially frustoconical body having a small leading end for mounting a pilot bar thereto and a large, trailing end for attachment to the leading end of said cylindrical body;
a second elongated blade slot along and through the longitudinal axis of said frustoconical cylindrical body;
second insert holder means for holding a plurality of cutting inserts along the leading edge thereof, said second insert holder means dimensioned for insertion thereof through said second blade slot and extending from said pilot hole to the innermost insert of said first insert holder;
second stabilizer means for supporting said second insert holder attached to the outermost sides of said second insert holder means, said stabilizer means dimensioned to conform to the wall of said hole, to provide support therefor and to preclude restricting fluid flow in and around said first insert holder means;
a plurality of second cutting inserts attached to the leading edge of said second insert holder means for cutting said metal billets with an overlapping cutting pattern; and
second conduit means for transporting cooling and chip removal fluid to the cutting site of the second cutting inserts.

15. A boring device as described in claim 14 wherein said first and said second insert holder means are at right angles the one to the other.

16. A boring device as described in claim 14 wherein said first cutting insert holder means is substantially rectangular in shape and, when attached to said first stabilizer means forms a D-shaped, semi-cylindrical body; and wherein said second cutting insert holder means is substantially rectangular in shape and, when attached to said second stabilizer means forms a D-shaped semicylindrical body.

17. A boring device as described in claim 16 wherein said first cutting insert holder means further comprises a plurality of rub strips mounted in each edge thereof for contacting the wall of the hole being drilled; and, said first stabilizer further comprises
a plurality of rub strips mounted on the back thereof for contacting the wall of the hole being drilled;
said second cutting insert holder means further comprises a plurality of rub strips mounted in each edge thereof for contacting the wall of the hole being drilled; and, said second stabilizer further comprises
a plurality of rub strips mounted on the back thereof for contacting the wall of the hole being drilled, and;
whereby the chatter experienced during boring operations is minimized.

18. A boring device as described in claim 14 wherein said first cutting inserts are polygonally shaped and have several edges each of which may positioned in the cutting edge position; and wherein said second cutting inserts are polygonally shaped and have several edges each of which may positioned in the cutting edge position.

19. A boring device described in claim 18 wherein said first inserts are housed in fixed pockets predetermining the rake angles with which the cutting edges are set; and wherein said second inserts are housed in fixed pockets predetermining the rake angles with which the cutting edges are set.

* * * * *